(12) United States Patent
Takahashi et al.

(10) Patent No.: US 10,438,024 B2
(45) Date of Patent: Oct. 8, 2019

(54) COMMUNICATION CONNECTION APPARATUS AND COMMUNICATION SYSTEM

(71) Applicant: MITSUBISHI HITACHI POWER SYSTEMS, LTD., Kanagawa (JP)

(72) Inventors: Toshiharu Takahashi, Kanagawa (JP); Yoshikazu Suzuki, Kanagawa (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 156 days.

(21) Appl. No.: 15/540,115

(22) PCT Filed: May 25, 2016

(86) PCT No.: PCT/JP2016/065417
§ 371 (c)(1),
(2) Date: Jun. 27, 2017

(87) PCT Pub. No.: WO2016/194725
PCT Pub. Date: Dec. 8, 2016

(65) Prior Publication Data
US 2018/0012041 A1 Jan. 11, 2018

(30) Foreign Application Priority Data
May 29, 2015 (JP) .................. 2015-110627

(51) Int. Cl.
*G06F 21/83* (2013.01)
*G06F 21/86* (2013.01)
(Continued)

(52) U.S. Cl.
CPC .............. *G06F 21/83* (2013.01); *G06F 21/86* (2013.01); *G21C 17/00* (2013.01); *H04B 3/54* (2013.01); *H04L 12/46* (2013.01)

(58) Field of Classification Search
None
See application file for complete search history.

(56) References Cited

U.S. PATENT DOCUMENTS 5,276,735 A * 1/1994 Boebert .............. G06F 12/1408
380/277
6,108,787 A 8/2000 Anderson et al.
(Continued)

FOREIGN PATENT DOCUMENTS

| JP | 11-502976 | 3/1999 |
| JP | 2003-152806 | 5/2003 |

(Continued)

OTHER PUBLICATIONS

International Search Report dated Aug. 16, 2016 in International (PCT) Application No. PCT/JP2016/065417.
(Continued)

*Primary Examiner* — Chico A Foxx
(74) *Attorney, Agent, or Firm* — Wenderoth, Lind & Ponack, L.L.P.

(57) ABSTRACT

A communication connection apparatus controls connection of a communication line between a first and second communication devices comprising: a first connection port for the first communication device, including a first transmission unit through which a signal from the first communication device passes and a first reception unit through which a signal for the first communication device passes; a second connection port for the second communication device, including a second transmission unit through which a signal from the second communication device passes and a second reception unit through which a signal for the second communication device passes; a first connection line connecting the first transmission unit and the second reception unit; and a simulated-signal input unit that inputs a first signal to the first reception unit. On the first signal being input to the first (Continued)

reception unit, the first reception unit and the second transmission unit are physically disconnected.

7 Claims, 4 Drawing Sheets

(51) Int. Cl.
*G21C 17/00* (2006.01)
*H04L 12/46* (2006.01)
*H04B 3/54* (2006.01)

(56) References Cited

U.S. PATENT DOCUMENTS

| | | | | |
|---|---|---|---|---|
| 7,493,238 | B2* | 2/2009 | Tanaka | G01M 13/028 |
| | | | | 702/183 |
| 8,250,358 | B2 | 8/2012 | Cheng | |
| 2003/0039257 | A1* | 2/2003 | Manis | H04B 3/54 |
| | | | | 370/400 |
| 2004/0019642 | A1* | 1/2004 | Jinzaki | H04L 12/18 |
| | | | | 709/205 |
| 2007/0182983 | A1* | 8/2007 | Wyatt | G06F 21/50 |
| | | | | 358/1.15 |
| 2007/0192513 | A1* | 8/2007 | Koo | G06F 1/266 |
| | | | | 710/1 |
| 2008/0077714 | A1* | 3/2008 | Wight | G06F 3/023 |
| | | | | 710/18 |
| 2014/0149872 | A1* | 5/2014 | Komori | H04M 1/7253 |
| | | | | 715/736 |

FOREIGN PATENT DOCUMENTS

| | | |
|---|---|---|
| JP | 2012-039434 | 2/2012 |
| JP | 2012-523170 | 9/2012 |
| JP | 2013-195398 | 9/2013 |
| JP | 2014-140096 | 7/2014 |

OTHER PUBLICATIONS

Written Opinion of International Searching Authority dated Aug. 16, 2016 International (PCT) Application No. PCT/JP2016/065417.
Extended European Search Report dated Mar. 26, 2018 in European Patent Application No. 16803160.7.

* cited by examiner

COMMUNICATION CONNECTION APPARATUS AND COMMUNICATION SYSTEM

CROSS-REFERENCE TO RELATED APPLICATION

This application is a national stage of PCT International Application No. PCT/JP2016/065417, filed on May 25, 2016, which claims priority to and incorporates by reference the entire contents of Japanese Patent Application No. 2015-110627 filed in Japan on May 29, 2015.

The present disclosure relates to a communication connection apparatus and a communication system including the same.

BACKGROUND

With regard to a control device used in power generation facilities and disaster-prevention infrastructure facilities such as gates and floodgates of a dam, high security characteristics enabling prevention of illegal access and virus entry from outside are required. Meanwhile, in order to achieve operability improvement and quick response in case of trouble, there are cases where acquisition of information from a device, for which high security characteristics are required, via a communication network is required. When such a communication system is established, various types of devices are provided to protect a device for which high security characteristics are required.

For example, there is described a communication system including: a data collection device that is connected to disaster-prevention infrastructure facilities and collects facility data related to the disaster-prevention infrastructure facilities; an intermediate storage device that is provided separately from the data collection device and includes an intermediate storage unit that stores therein facility data collected by the data collection device; a remote monitoring device that can receive the facility data stored in the intermediate storage unit of the intermediate storage device via an external network; and a switch device that can switch a state of the communication system among a disconnection state in which communication between the data collection device and the intermediate storage device is disconnected and communication between the intermediate storage device and the external network is disconnected, a first connection state in which the data collection device and the intermediate storage device are connected to each other to be at least capable of communicating the facility data and the communication between the intermediate storage device and the external network is disconnected, and a second connection state in which the communication between the data collection device and the intermediate storage device is disconnected and the intermediate storage device and the external network are connected to each other to be at least capable of communicating the facility data (Japanese Laid-open Patent Publication No. 2013-195398).

Even when the communication system described in Japanese Laid-open Patent Publication No. 2013-195398 is used, the system can be set in a state of being physically connected to a communication line, and thus there is a risk that a protection-target communication device becomes accessible. Further, by connecting two communication devices communicating with each other via a dedicated line, it is possible to improve the security of these devices; however, if the two devices communicating with each other are provided to be apart, installation of the dedicated line is troublesome.

An object of the invention is to provide a communication connection apparatus that can output data from a protection-target communication device to another communication device with a simple configuration while preventing access to the protection-target communication device, and a communication system including the communication connection apparatus.

According to the present disclosure, there is provided a communication connection apparatus that is configured to control connection of a communication line between at least one first communication device and at least one second communication device, the communication connection apparatus comprising: a first connection port to which a connection line to the at least one first communication device is connected, and which includes a first transmission unit through which a signal output from the at least one first communication device passes and a first reception unit through which a signal to be input to the at least one first communication device passes; a second connection port to which a connection line to the at least one second communication device is connected, and which includes a second transmission unit through which a signal output from the at least one second communication device passes and a second reception unit through which a signal to be input to the at least one second communication device passes; a first connection line that connects the first transmission unit and the second reception unit to each other; and a simulated-signal input unit that inputs, to the first reception unit, a first signal which is a signal for recognizing that the at least one first communication device is connectable to other devices, wherein when the first signal is being input to the first reception unit, the first reception unit and the second transmission unit are physically disconnected from each other.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENT

An exemplary embodiment of the present disclosure will be described below with reference to accompanying drawings. The present disclosure is not limited to this embodiment. Constituent elements described in the following embodiment include elements that are easily replaceable by persons skilled in the art and elements that are substantially equivalent.

Figure 1:
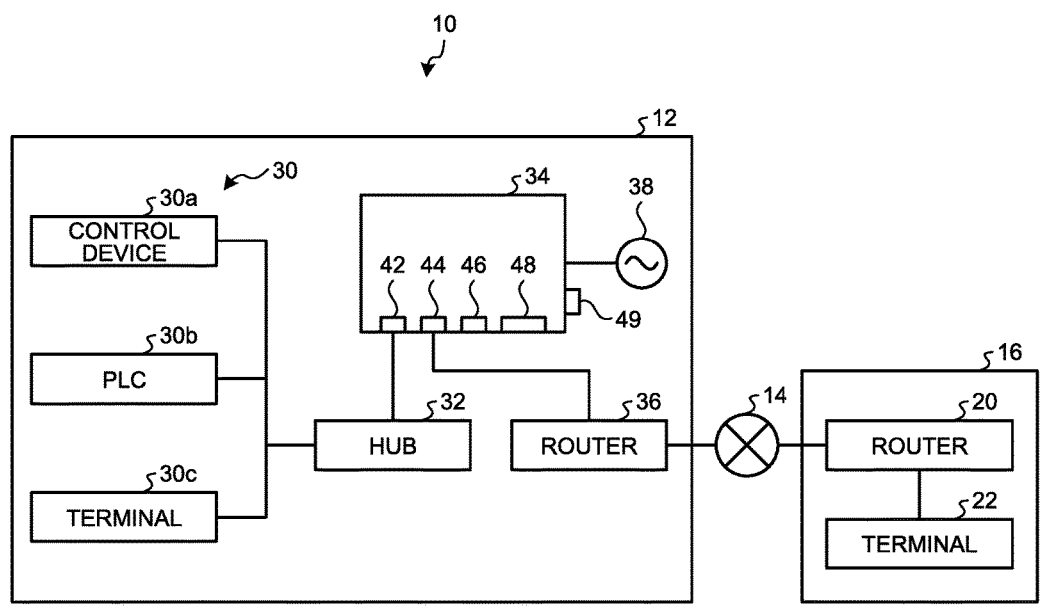
FIG. 1 is a block diagram illustrating a schematic configuration of a communication system.

FIG. 1 is a block diagram illustrating a schematic configuration of a communication system. In a communication system 10, a communication device provided in an upstream facility 12 and a communication device provided in a downstream facility 16 are connected to each other via an Internet communication network 14. In this example, the communication devices are various types of devices that can perform transmission and reception of data. The upstream facility 12 is a facility in which a protection-target communication device is provided. As the upstream facility 12, power generation facilities and disaster-prevention infrastructure facilities such as gates and floodgates of a dam can be exemplified. The Internet communication network 14 is a public communication network, and connects communication between communication devices that are connected to the communication network in a wired or wireless manner, for example. The downstream facility 16 is a facility that receives information from the communication device of the upstream facility 12 and performs remote monitoring. The downstream facility 16 includes a router 20 and a terminal (second communication device, downstream communication device) 22. The terminal 22 is a personal computer, for example. The terminal 22 is connected to the Internet communication network 14 via the router 20. The terminal 22 performs communication with another communication device that is connected thereto via the Internet communication network 14 and performs transmission and reception of data.

The upstream facility 12 includes first communication devices (upstream communication devices) 30, a hub 32, a communication connection apparatus 34, a router 36, and a power source 38. The first communication devices (upstream communication devices) 30 include a plurality of devices that are provided in the upstream facility 12 and have a function of transmitting and receiving data. In FIG. 1, a control device 30a, a PLC (Programmable Logic Controller) 30b, and a terminal 30c are provided as the first communication devices 30. The first communication devices 30 are not limited to the devices described above, and other various communication devices can be used. For example, as the first communication device 30, a workstation or a data server can be used. Further, it suffices that the first communication device 30 is constituted by at least one device, and the configuration thereof is not particularly limited to any specific one. The first communication devices 30 can accumulate data such as measurement data and control conditions of an operating target of the upstream facility 12 and can output the accumulated data.

The hub 32 is provided between the plurality of first communication devices 30 and the communication connection apparatus 34. The hub 32 integrates lines of the plurality of first communication devices 30 to connect each of the plurality of first communication devices 30 and the communication connection apparatus 34 to each other. The communication connection apparatus 34 is described later. The router 36 connects the communication connection apparatus 34 and the Internet communication network 14 to each other. The power source 38 is a supply source for supplying power to the communication connection apparatus 34.

Figure 2:
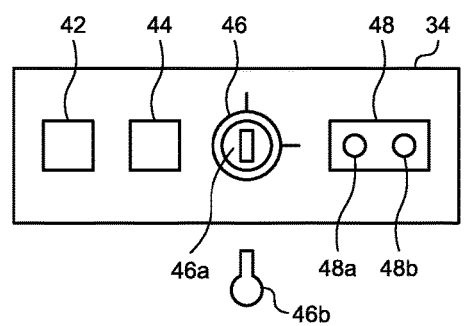
FIG. 2 is a front view illustrating an exterior of a communication connection apparatus.
Figure 3:
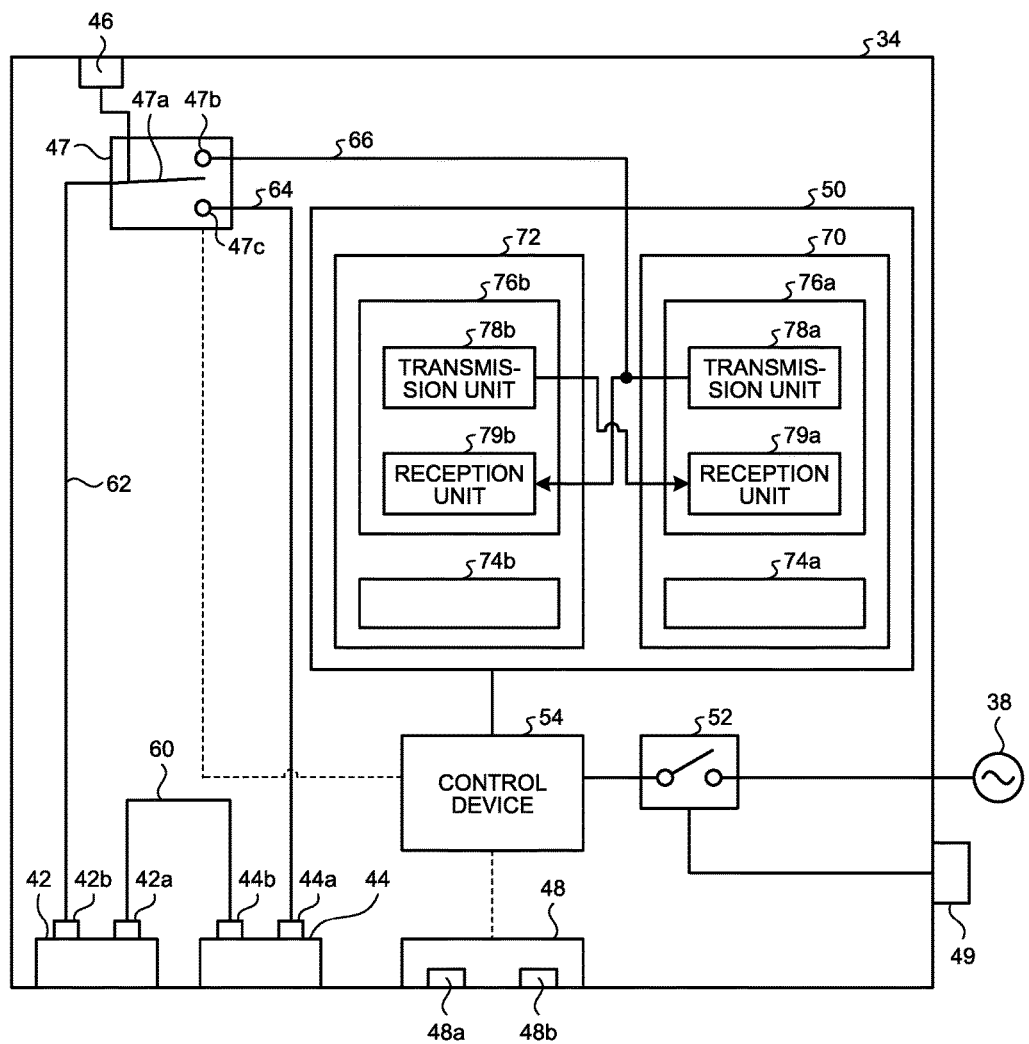
FIG. 3 is a block diagram illustrating a schematic configuration of the communication connection apparatus.

Next, with reference to FIGS. 2 and 3 along with FIG. 1, details of the communication connection apparatus 34 are described. FIG. 2 is a front view illustrating an exterior of the communication connection apparatus. FIG. 3 is a block diagram illustrating a schematic configuration of the communication connection apparatus. The communication connection apparatus 34 is connected to the hub 32 and the router 36. Therefore, the communication system 10 connects the first communication devices 30 and the terminal (second communication device) 22 to each other via the hub 32, the communication connection apparatus 34, the router 36, the Internet communication network 14, and the router 20.

The communication connection apparatus 34 establishes a communication state (a first communication mode) in which data can be output from the first communication devices 30 to the terminal (second communication device) 22, and access to the first communication devices 30 from devices which include the terminal (second communication device) 22 and are provided on the side of the router 36 with respect to the communication connection apparatus 34 cannot be made. Further, the communication connection apparatus 34 according to the present embodiment can switch the state of the communication system 10 to a state (a second communication mode) in which data communication can be performed bidirectionally between the first communication devices 30 and the terminal (second communication device) 22.

As illustrated in FIGS. 1 and 2, the communication connection apparatus 34 includes a first connection port (upstream port) 42, a second connection port (downstream port) 44, a physical switch 46, a display unit 48, and a power-source physical switch 49. The first connection port 42 is a connection unit that is connected to the hub 32 via a communication line (data line). The second connection port 44 is a connection unit that is connected to the router 36 via a communication line (data line).

The physical switch 46 is a switch that is operated by a user to switch between the first communication mode and the second communication mode. The physical switch 46 includes a keyhole 46a and a key 46b that is insertable to the keyhole 46a. With regard to the physical switch 46, an orientation of the keyhole 46a is changed according to a direction of the key 46b. The physical switch 46 switches between the first communication mode and the second communication mode according to the orientation of the keyhole 46a.

The display unit 48 includes a unidirectional communication display lamp 48a and a bidirectional communication display lamp 48b. On the display unit 48, when the communication system 10 is in the first communication mode, the unidirectional communication display lamp 48a is turned on and the bidirectional communication display lamp 48b is turned off. On the display unit 48, when the communication system 10 is in the second communication mode, the unidirectional communication display lamp 48a is turned off and the bidirectional communication display lamp 48b is turned on. The power-source physical switch 49 is a switch by which a user inputs an operation for switching ON and OFF of power supply from the power source 38 to the communication connection apparatus 34.

Next, functional configurations of the communication connection apparatus 34 are described. As illustrated in FIG. 3, the communication connection apparatus 34 includes a switching unit 47, a simulated-signal input unit 50, a power-source circuit switch 52, a control device 54, a first connection line 60, and second connection lines 62, 64, and 66 (a line unit), in addition to the first connection port 42, the second connection port 44, the physical switch 46, the display unit 48, and the power-source physical switch 49.

The first connection port 42 is connected to the hub 32 via the communication line, and includes a first transmission unit 42a and a first reception unit 42b. Signals output from the first communication devices 30 pass through the first transmission unit 42a via the hub 32. That is, data transmitted from the first communication devices 30 passes through the first transmission unit 42a. Signals to be input to the first communication devices 30 pass through the first reception unit 42b via the hub 32. That is, data to be received by the first communication devices 30 passes through the first reception unit 42b.

The second connection port 44 is connected to the router 36 via the communication line, and includes a second transmission unit 44a and a second reception unit 44b. Signals output from the terminal 22 pass through the second transmission unit 44a via the router 36, the Internet communication network 14, and the like. That is, data transmitted from the terminal 22 passes through the second transmission unit 44a. Signals to be input to the terminal 22 via the router 36, the Internet communication network 14, and the like pass through the second reception unit 44b. That is, data to be received by the terminal 22 passes through the second reception unit 44b. The first connection line 60 connects the first transmission unit 42a and the second reception unit 44b to each other.

The switching unit 47 switches between the first communication mode and the second communication mode in conjunction with operations on the physical switch 46. The switching unit 47 includes a movable unit 47a, a terminal 47b, and a terminal 47c. The movable unit 47a is connected to the second connection line 62. The terminal 47b is connected to the second connection line (line unit) 66. The terminal 47c is connected to the second connection line 64. The second connection line 62 connects the first reception unit 42b and the switching unit 47 to each other. The second connection line 64 connects the second transmission unit 44a and the switching unit 47 to each other. The second connection line 66 connects the simulated-signal input unit 50 and the switching unit 47 to each other. By connecting the movable unit 47a and the terminal 47b to each other, the switching unit 47 sets a state in which the first reception unit 42b and the simulated-signal input unit 50 are connected to each other, thereby realizing the first communication mode. By connecting the movable unit 47a and the terminal 47c to each other, the switching unit 47 sets a state in which the first reception unit 42b and the second transmission unit 44a are connected to each other, thereby realizing the second communication mode.

The simulated-signal input unit (first signal input unit) 50 outputs a simulated signal (first signal). When the switching unit 47 is in the first communication mode, the simulated signal output from the simulated-signal input unit 50 passes through the first reception unit 42b and is input to the first communication devices 30. The simulated signal is a signal for the first communication devices 30 to recognize that they are in a state of outputting a signal, that is, for the first communication devices 30 to recognize that communication with other communication devices has been established. In other words, the simulated signal is a signal for recognizing that the first communication devices 30 are connectable to other devices.

The simulated-signal input unit 50 includes two internal communication devices (serial Ethernet converters) 70 and 72. The two internal communication devices 70 and 72 have an identical configuration. The internal communication device 70 includes a serial port 74a and an Ethernet® port 76a. The serial port 74a receives a seizing signal input from the control device 54. Upon reception of the seizing signal, the serial port 74a outputs a command for starting a communication establishing operation to the Ethernet® port 76a. The Ethernet® port 76a includes a transmission unit 78a and a reception unit 79a.

The internal communication device 72 includes a serial port 74b and an Ethernet® port 76b. The serial port 74b receives a seizing signal input from the control device 54. Upon reception of the seizing signal, the serial port 74b outputs a command for starting a communication establishing operation to the Ethernet® port 76b. The Ethernet® port 76b includes a transmission unit 78b and a reception unit 79b. In the simulated-signal input unit 50, the Ethernet® port 76a and the Ethernet® port 76b are connected to each other via a communication line. Specifically, in the simulated-signal input unit 50, the transmission unit 78a of the Ethernet® port 76a and the reception unit 79b of the Ethernet® port 76b are connected to each other. Further, in the simulated-signal input unit 50, the transmission unit 78b of the Ethernet® port 76b and the reception unit 79a of the Ethernet® port 76a are connected to each other.

When the simulated-signal input unit 50 is activated, a seizing signal is input from the control device 54 to both serial ports 74a and 74b of the internal communication devices 70 and 72, respectively. In the simulated-signal input unit 50, when a seizing signal is input to the serial ports 74a and 74b, communication is established between the Ethernet® port 76a and the Ethernet® port 76b.

In the simulated-signal input unit 50, a line connecting the transmission unit 78a and the reception unit 79b to each other is connected to the second connection line 66. The simulated-signal input unit 50 outputs, as a simulated signal, a signal indicating that communication of a signal transmitted from the transmission unit 78a to the reception unit 79b is established to the second connection line 66.

The power-source circuit switch 52 is provided on a power line that connects the power source 38 and the control device 54 to each other. The power-source circuit switch 52 switches, in conjunction with the power-source physical switch 49, ON and OFF of the connection between the power source 38 and the control device 54. The power supplied to the control device 54 is transmitted to respective units of the communication connection apparatus 34 via the control device 54.

The control device 54 controls activating and deactivating of the simulated-signal input unit 50, and controls a lighting state of the display unit 48 according to the state of the switching unit 47. It suffices that the control device 54 is a control circuit that outputs a set signal based on an input signal.

Figure 4:
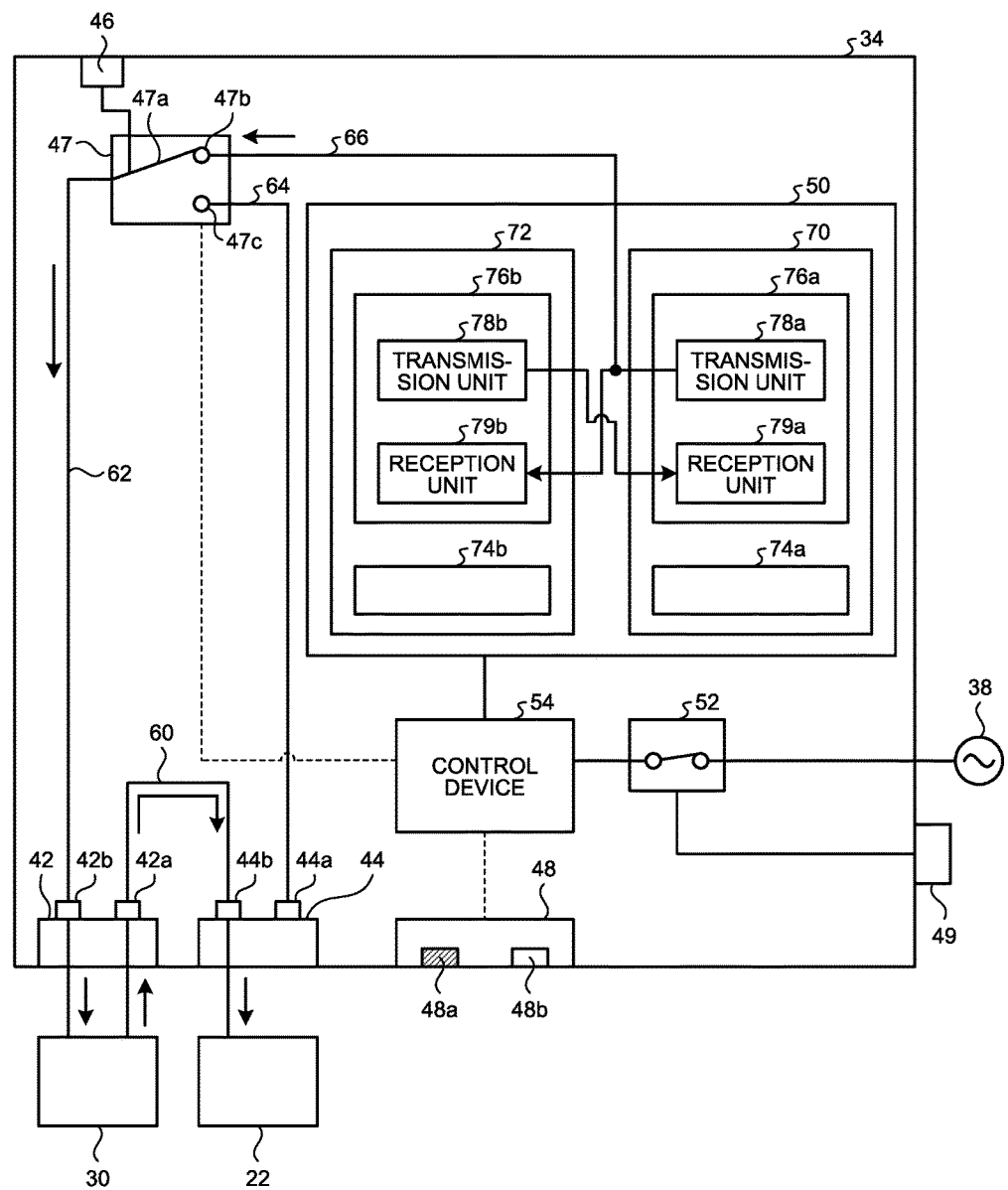
FIG. 4 is an explanatory diagram for explaining an operation of the communication connection apparatus.
Figure 5:
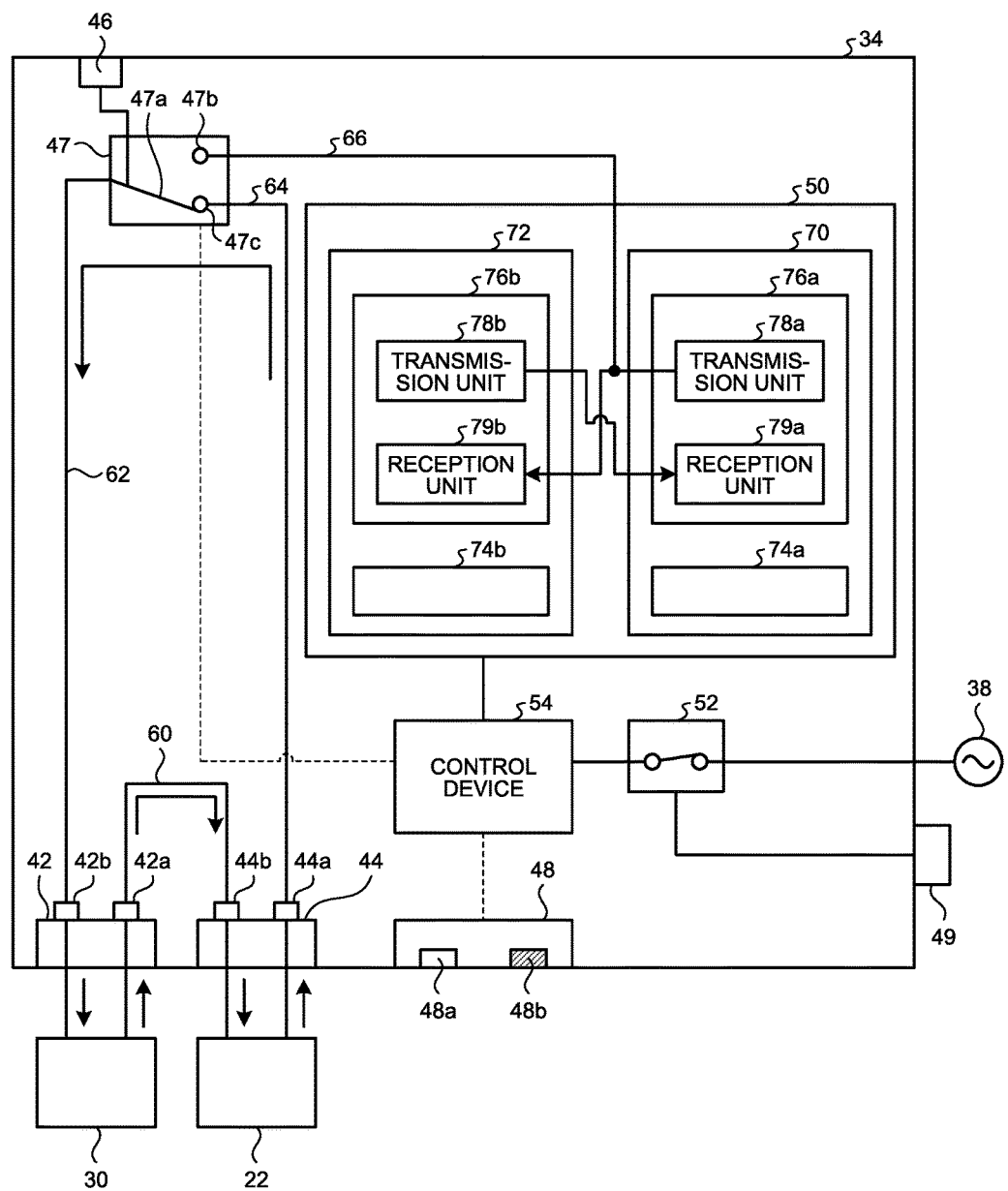
FIG. 5 is an explanatory diagram for explaining an operation of the communication connection apparatus.

Next, with reference to FIGS. 4 and 5, operations of the communication connection apparatus are described. FIGS. 4 and 5 are explanatory diagrams for explaining operations of the communication connection apparatus. FIG. 4 illustrates a state of the first communication mode. FIG. 5 illustrates a state of the second communication mode.

As illustrated in FIG. 4, when the movable unit 47a of the switching unit 47 is connected to the terminal 47b according to the operation on the physical switch 46, the communication connection apparatus 34 performs communication in the first communication mode. In this case, in the communication connection apparatus 34, the unidirectional communication display lamp 48a is turned on and the bidirectional communication display lamp 48b is turned off.

In the communication connection apparatus 34, as the movable unit 47a of the switching unit 47 is connected to the terminal 47b, the simulated-signal input unit 50 and the first reception unit 42b are connected to each other, and the second transmission unit 44a and the first reception unit 42b are disconnected from each other. Due to this configuration, in the communication connection apparatus 34, a simulated signal output from the simulated-signal input unit 50 is input to the first reception unit 42b. In the communication system 10, the simulated signal output from the simulated-signal input unit 50 passes through the first reception unit 42b, and is input to the first communication devices 30. Upon input of the simulated signal, the first communication devices 30 determine that communication with other devices has been established, and output set data. In this case, the first communication devices 30 are set to output data in UDP (User Datagram Protocol) broadcast communication. The data output from the first communication devices 30 passes through the first transmission unit 42a, the first connection line 60, and the second reception unit 44b, and is output to the router 36 from the communication connection apparatus 34. The data output to the router 36 is output to the Internet communication network 14. The terminal (second communication device) 22 receives the data output to the Internet communication network 14, thereby receiving the data output from the first communication devices 30.

Next, as illustrated in FIG. 5, when the movable unit 47a of the switching unit 47 is connected to the terminal 47c according to the operation on the physical switch 46, the communication connection apparatus 34 performs communication in the second communication mode. In this case, in the communication connection apparatus 34, the unidirectional communication display lamp 48a is turned off and the bidirectional communication display lamp 48b is turned on.

In the communication connection apparatus 34, as the movable unit 47a of the switching unit 47 is connected to the terminal 47c, the second transmission unit 44a and the first reception unit 42b are connected to each other. In the communication connection apparatus 34, the transmission unit and the reception unit in both directions between the first communication devices 30 and the terminal 22 are connected to each other respectively, so that bidirectional communication between the first communication devices 30 and the terminal 22 can be performed. In the communication connection apparatus 34, a signal for establishing communication output from the terminal 22 is input to the first communication devices 30 via the second transmission unit 44a, the first reception unit 42b, and the like. Further, in the communication connection apparatus 34, a signal for establishing communication output from the first communication device 30 is input to the terminal 22 via the first transmission unit 42a, the second reception unit 44b, and the like. In this manner, in the communication system 10 in the second communication mode, communication is established between the first communication devices 30 and the terminal 22 in bidirectional communication, thereby realizing a state in which data can be transmitted and received between the first communication devices 30 and the terminal 22. In this case, between the first communication devices 30 and the terminal 22, mutual authentication is made by using, for example, a TCP (Transmission Control Protocol)/IP (Internet Protocol) protocol to establish communication.

Due to the configuration described above, when the communication connection apparatus 34 is in the first communication mode, a simulated signal is input to the first communication devices 30 via the first reception unit 42b and the first communication devices 30 are caused to determine that communication is established, so that data can be output from the first communication devices 30 in a state in which the first reception unit 42b and the second transmission unit 44a are physically disconnected from each other. Due to this configuration, it is possible to set a state in which a line for transmitting data to the first communication devices 30 from communication devices on a downstream side (the side of the router 36) with respect to the communication connection apparatus 34 is physically disconnected. Due to this configuration, it is possible to set a state in which the first communication devices 30 cannot be physically accessed from the downstream side (the side of the router 36) with respect to the communication connection apparatus 34, and it is possible to prevent illegal access and virus entry to the first communication devices 30, thereby setting the first communication devices 30 to be in a safer state.

Further, in the communication system 10, by setting the first communication devices 30 to output data in UDP (User Datagram Protocol) broadcast communication, output of data from the first communication devices 30 can be started with input of a simulated signal that is a signal indicating establishment of communication between other communication devices.

Further, when the first communication devices 30 output data, it is preferable that the data is partitioned in accordance with an output format of the data, specifically, partitioned in accordance with a packet of UDP broadcast communication, and that each piece of data is transmitted with an identification (ID) code attached thereto. In this case, by combining received pieces of data based on their identification (ID) codes, the terminal 22 can reproduce the original data. Due to this configuration, data having a large data amount can be transmitted. Further, even if data is defective, the data can be recognized based on its identification (ID) code.

When power supply from the power source 38 is stopped, the communication connection apparatus 34 stops output of a simulated signal. Due to this configuration, when the communication connection apparatus 34 has a failure in the first communication mode, input of a simulated signal to the first communication devices 30 is stopped while a state is maintained in which a line from other communication devices to the first communication devices 30 via the communication connection apparatus 34 is not connected. Due to this configuration, it is possible to maintain a state in which access to the first communication devices 30 from other communication devices on the downstream side with respect to the communication connection apparatus 34 cannot be made, thereby maintaining the safety of the first communication devices 30.

In the communication connection apparatus 34, by providing the physical switch 46 and the switching unit 47 and also providing a route that can connect the first reception unit 42b and the second transmission unit 44a to each other, it is possible to make the first communication mode and the second communication mode selectable.

It is preferable that the communication connection apparatus 34 has a configuration such that, in a state in which the key 46b of the physical switch 46 is inserted into the keyhole 46a, the key 46b is oriented to a predetermined direction, and the key cannot be removed from the keyhole 46a, the mode of the communication connection apparatus 34 is switched to the second communication mode. Due to this configuration, only when the key 46b is inserted into the keyhole 46a and set in a predetermined orientation, communication in the second communication mode can be performed.

The technical scope of the present invention is not limited to the embodiment described above, and modifications can be made as appropriate without departing from the scope of the present invention.

In the communication connection apparatus 34 according to the embodiment described above, while the switching unit 47 is provided and the first communication mode and the second communication mode are switchable, it is also possible to configure the communication connection apparatus 34 in which only the first communication mode is executable. In this manner, by having a configuration in which the second communication mode cannot be executed, it is possible to more securely set a state in which data cannot be transmitted to the first communication devices 30 from the side of the router 36 (the downstream side) with respect to the communication connection apparatus 34, and it is also possible to prevent access from outside to the first communication devices 30 more securely.

In the communication connection apparatus 34 according to the embodiment described above, the simulated-signal input unit 50 includes the two internal communication devices 70 and 72, and a signal indicating establishment of communication between the two internal communication devices 70 and 72 is input to the first reception unit 42b, for having a high possibility of the first communication devices 30 determining that communication is established and for outputting data from the first communication devices 30 more easily; however, the simulated signal to be input to the first reception unit 42b is not limited thereto. It suffices that the simulated signal is a signal by which it is possible for the first communication devices 30 to determine that communication is established. For example, it is possible to have a configuration such that the simulated-signal input unit 50 uses an oscillator that generates the same signal as the signal by which it is possible for the first communication devices 30 to determine that communication is established, and such that a signal output from the oscillator is regarded as a simulated signal.

It is preferable that the simulated-signal input unit 50 outputs data of a serial signal. By setting the signal as a serial signal, the simulated signal is more recognizable. Further, the simulated-signal input unit 50 can also output a signal of text data in addition to a simulated signal. Due to this configuration, by outputting a signal of text data from the simulated-signal input unit 50, processing in the first communication devices 30 can be performed more easily, and a signal output from the simulated-signal input unit 50 can be used more easily for controlling confirmation of the communication state.

In the embodiment described above, a case where a general communication line is used as the Internet communication network 14 has been exemplified; however, the embodiment is not limited thereto. For example, it is possible to employ a configuration in which a dedicated line and a general communication line are used together as the communication network.

According to the present disclosure, it is possible to configure so that output of data from a second communication device to a first communication device with physical connection cannot be made, and that output of data from the first communication device to the second communication device can be made. Due to this configuration, data can be output from a protection-target communication device to another communication device with a simple configuration while access to the protection-target communication device is prevented.

Although this disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A communication connection apparatus that is configured to control connection of a communication line between at least one first communication device and at least one second communication device, the communication connection apparatus comprising:
   a first connection port to which a connection line to the at least one first communication device is connected, and which includes a first transmission unit through which a signal output from the at least one first communication device passes and a first reception unit through which a signal to be input to the at least one first communication device passes;
   a second connection port to which a connection line to the at least one second communication device is connected, and which includes a second transmission unit through which a signal output from the at least one second communication device passes and a second reception unit through which a signal to be input to the at least one second communication device passes;
   a first connection line that connects the first transmission unit and the second reception unit to each other;
   a simulated-signal input unit that inputs, to the first reception unit, a first signal which is a signal for recognizing that the at least one first communication device is connectable to other devices; and
   a switching unit that includes a physical switch to be operated by a user to switch between a first communication mode and a second communication mode, wherein the switching unit is provided on a line connecting the simulated-signal input unit and the first reception unit to each other, and
   wherein when the first signal is being input to the first reception unit, the first reception unit and the second transmission unit are physically disconnected from each other.

2. The communication connection apparatus according to claim 1, wherein the first signal is a serial signal.

3. The communication connection apparatus according to claim 2, wherein
   the simulated-signal input unit includes two internal communication devices and a line unit that is connected to the first reception unit, and
   the simulated-signal input unit causes communication between the two internal communication devices to be established, and inputs a signal output from a transmission unit of either one of the two internal communication devices to a reception unit of the other one of the two internal communication devices to the first reception unit via the line unit as the first signal.

4. The communication connection apparatus according to claim 1, comprising:
   a second connection line that connects the switching unit and the a second input transmission unit to each other, wherein
   the switching unit switches a state of the communication connection apparatus between the first communication mode which is a state in which the simulated-signal input unit and the first reception unit are connected to each other and the second communication mode which is a state in which the second connection line and the first reception unit are connected to each other.

5. The communication connection apparatus according to claim 4, wherein the physical switch includes a key and a keyhole, and the second connection line and the first reception unit can be connected to each other only in a state in which the key is inserted into the keyhole.

6. The communication connection apparatus according to claim 1, wherein the first signal is a signal for recognizing that data can be output from the first transmission unit in User Datagram Protocol broadcast communication.

7. A communication system comprising:
at least one first communication device;
at least one second communication device;
the communication connection apparatus according to claim 1; and
a public communication line network that connects the at least one second communication device and the communication connection apparatus to each other.

* * * * *